Aug. 4, 1953    D. METTETAL, JR    2,647,760
SADDLE MOUNT
Filed July 20, 1949    2 Sheets-Sheet 1
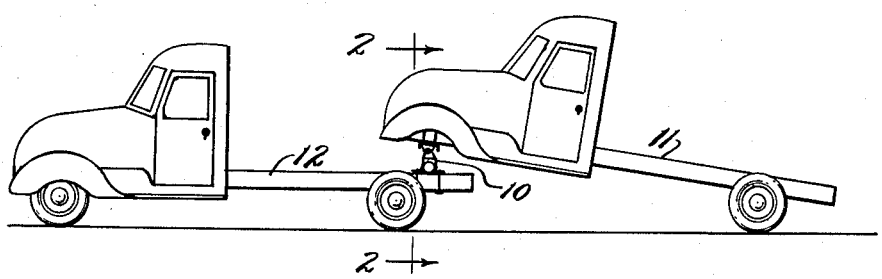
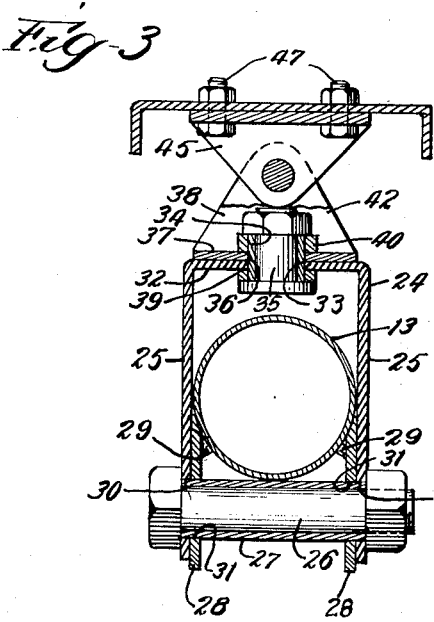
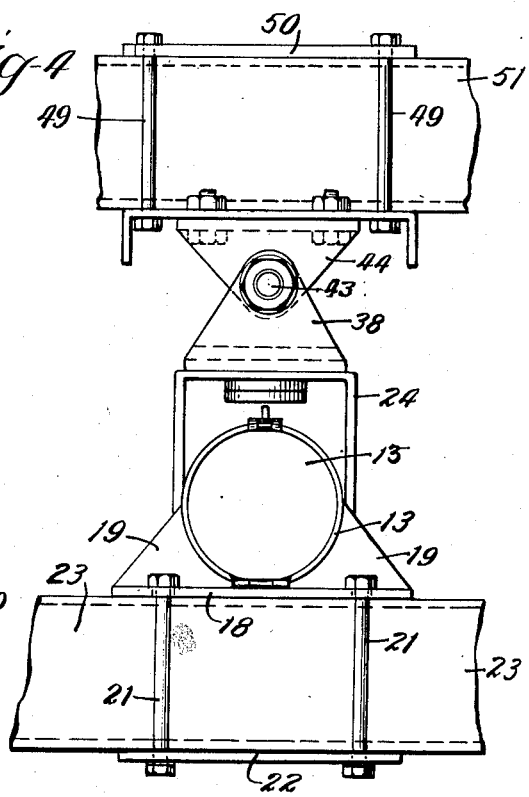
Inventor
Donald Mettetal Jr.
By:-
Cromwell, Greist & Warden
Attys.

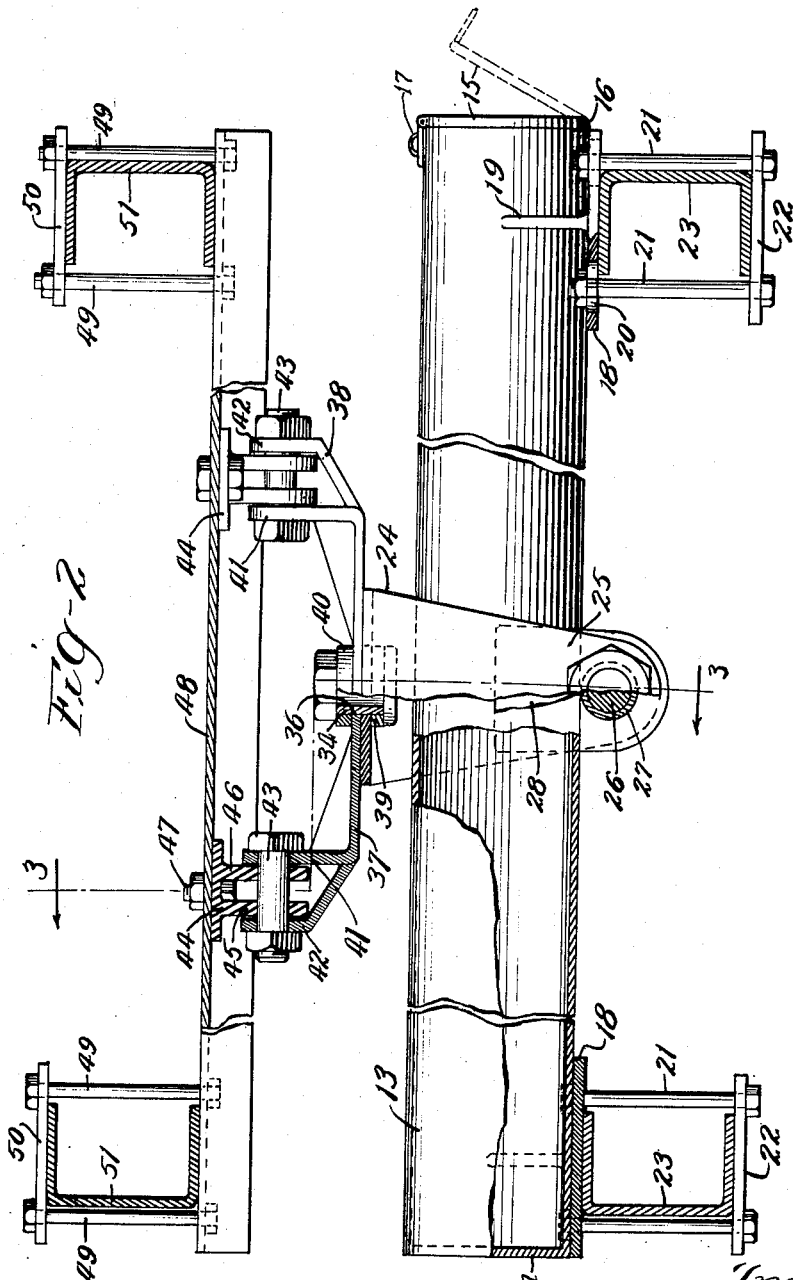

Patented Aug. 4, 1953

2,647,760

UNITED STATES PATENT OFFICE 2,647,760

SADDLE MOUNT

Donald Mettetal, Jr., Chicago, Ill., assignor to Truck Service, Inc., Chicago, Ill., a corporation of Illinois Application July 20, 1949, Serial No. 105,690

3 Claims. (Cl. 280—33.05)

This invention is concerned with improvements in a saddle mount for use in supporting one end of a wheeled vehicle on the frame or body portion of another wheeled vehicle so that the former may be conveniently hauled or towed by the latter.

It is an object of the invention to provide a saddle mount or connecting device for attachment to the trailing end of a wheeled vehicle, such as an auto truck, for supporting thereon in elevated position one end of another vehicle of a similar character, so that the latter may be transported or towed by the former without twisting or distorting the frame of either vehicle.

It is another object of the invention to provide a saddle mount construction for the purpose described which is adapted to support the elevated end of the vehicle being towed in such a manner as to permit limited sidewise swinging movement of the same relative to the towing vehicle and thereby minimize the stress applied to the frame of either vehicle.

It is a more specific object of the invention to provide a saddle mount for the purpose described which comprises a length of tubular material adapted to be detachably secured at opposite ends to the side frame members of the towing vehicle, a saddle member having depending legs arranged with the legs thereof straddling the tubular member and pivoted thereto for swinging movement about an axis extending transversely of the same and a bracket member adapted to be secured at its outer ends to the under frame of the towed vehicle and pivotally connected to the saddle member above the tubular member for swinging movement about an axis extending longitudinally of the same.

It is another object of the invention to provide a saddle mount for the purpose described which comprises an elongated hollow supporting member adapted to be secured at its ends to the side frame members of the towing vehicle, an inverted U-shaped saddle member pivotally connected at the ends of its legs to the sides of the transversely extending supporting member and in straddling relation to the same, an elongate bracket pivotally connected to the saddle member for swinging movement about an axis extending transversely of the same, and connector plates pivotally mounted at the opposite ends of the bracket and adapted to be secured to the under carriage of the towed vehicle.

These and other objects of the invention will be apparent from a consideration of the device which is shown by way of illustration in the accompanying drawings, wherein:

Fig. 1 is a side elevation showing two vehicles connected by a saddle mount which incorporates therein the principles of the invention, with the vehicles shown schematically;

Fig. 2 is an elevation to an enlarged scale of the saddle mount, the view being taken generally on the line indicated at 2—2 in Fig. 1 and portions being broken away;

Fig. 3 is a transverse section taken generally on the line 3—3 of Fig. 2; and

Fig. 4 is an end elevation of the saddle mount.

Referring to the drawings, there is illustrated a saddle mount 10 which incorporates the principles of the invention and which is adapted for supporting either end of an automobile or truck 11 which is being towed by another similar vehicle 12.

The saddle mount 10 comprises an elongate tube section 13 which is preferably closed at the one end 14 and provided at the other end with a cap or cover member 15 which is hinged at 16 and provided with a locking device 17. The cover member 15 may be opened as indicated in dotted lines in Fig. 2. Loose parts may be carried in the tube section 13 when desired. The tube section 13 is provided at its opposite ends with laterally extending base plates 18 which are secured thereto by welding or other fastening means and which may have one or more reinforcing or bracing ribs or webs 19. The base plates 18 are provided with elongate apertures 20 adapted to receive headed fastening bolts 21 secured by means of plates 22 beneath the side frame members 23 of the towing vehicle 12. In some types of vehicles the bolts 21 may be secured directly to a cross bar on the frame.

A saddle member 24 of generally U-shaped section is arranged in inverted relation with the legs 25 thereof depending on opposite sides of the tube 13. A cross pivot bolt 26 is journaled in a sleeve 27 supported by and secured to depending brackets 28 which are in turn secured by welding or the like at 29 to the tube member 13. The cross sleeve 27 extends through apertures 30 and 31 provided in the ends of the depending legs 25 and brackets 28, respectively, and is fastened relative to the brackets 28. The bight or base portion 32 of the saddle member 24 is spaced some distance above the top edge of the tube 13 and has a limited swinging movement about the pivot sleeve in a direction longitudinally of the tube 13. The base 32 of the saddle 24 is apertured at 33 for receiving in secured relation therein a vertically extending pivot sleeve 34 and a pivot bolt 35. The sleeve 34 extends through an aperture 36 in the base 37 of a bracket 38 which extends in the same general direction as the tube section 13. Washers 39 and 40 are provided at opposite ends of the sleeve 34.

The bracket 38 is generally elongate but of less length than the supporting tube section 13. At each of its outer ends the bracket 38 is provided with a pair of spaced upstanding inner and outer journal forming members 41 and 42 which are apertured to receive the pivot bolts 43 extending longitudinally of the bracket 38. The pivot bolts 43 support bracket or shoe members 44 each of which has a pair of depending spaced legs 45 and 46. Legs 45 and 46 are apertured and received on the pivot bolt 43. The brackets 44 are apertured to receive vertically extending bolts 47 for securing the same to a cross channel member 48 which may be part of the undercarriage or bottom frame of the towed vehicle 11 or which may be secured at the ends by bolts 49 and plates 50 to the side frame members 51 of the same.

In securing the vehicles 11 and 12 together with the saddle mount 10 the front wheel structure of towed vehicle 11 may be removed if it interferes with the operation. Supported by means of the saddle mount 10 on the trailing end of the towing vehicle 12, the vehicle 11 is hauled on the wheels at the other end of the same. Any unevenness in the surface over which the vehicles pass when they are in connected relation is compensated for by movement of the pivoted members which constitute the saddle mount 10. It is possible for the towed vehicle 11 to tilt in both vertical and transverse directions relative to the towing vehicle 12 without imparting any twisting forces to the frame of either vehicle. This prevents any tendency to loosen the vehicle frame structures while they are in transit.

In the arrangement illustrated, the front or cab end of the towed vehicle 11 is connected by means of the saddle mount 10 with the towing vehicle 12. The towed vehicle 11 may be reversed and have the rear end supported on the towing vehicle 12. When so arranged the front wheels of towed vehicle 11 must be locked against turning movement so that the two vehicles are operated as a unit by the driver of the towing vehicle.

While specific details of construction have been shown for the purpose of illustration, it will be understood that other details of construction may be resorted to within the spirit of the invention.

I claim:

1. A saddle mount for supporting in elevated position one end of a towed vehicle on the rear end of a towing vehicle, said saddle mount comprising transversely extending elongate members, means for securing one of said elongate members to the side frame members of each vehicle, depending plate members secured to the sides of the lower one of said elongate members, a pivot member secured in said plate members and extending transversely of said elongate member, an inverted U-shaped member having its legs journaled on said pivot member, a pair of laterally spaced brackets secured to the upper one of said elongate members, and a U-shaped member having its upstanding legs pivotally connected to said pair of brackets, said U-shaped members having the bight portions thereof in juxtaposed relation and a pivot member connecting said bight portions.

2. A saddle mount for supporting in elevated position one end of a towed vehicle on the rear end of a towing vehicle, said saddle mount comprising transversely extending elongate frame members, means for securing one of said elongate frame members to the longitudinally extending side frame members of each of the vehicles, hanger members secured in depending spaced relation on the lower one of said elongate members, an inverted U-shaped member having its legs straddling the lower one of said elongate members and pivotally connected to said depending hanger members, a pair of laterally spaced brackets secured in depending relation on the upper one of said elongate members, and a second U-shaped member having its legs upstanding and pivotally connected to said pair of depending brackets, said U-shaped members having the bight portions thereof in juxtaposed relation and pivotally secured to each other.

3. A saddle mount for supporting in elevated position one end of a towed vehicle on the rear end of a towing vehicle, said saddle mount comprising a pair of transversely extending elongate members, one of said members being of channel-shaped section and the other of said members being a hollow tube, means for securing the ends of each of said elongate members to the frame members of one of the vehicles, hanger members secured to opposite sides of the lower one of said elongate members, a pivot member extending between said hanger members in the longitudinal direction of the vehicles, a U-shaped member having its legs journaled on said pivot member and its bight portion above said elongate member, and a second U-shaped member having its legs extending upwardly and pivotally connected at laterally spaced points to the other one of said elongate members, the bight portions of said U-shaped members being in juxtaposed relation and connected by a pivot member.

DONALD METTETAL, Jr.

References Cited in the file of this patent

UNITED STATES PATENTS

| Number | Name | Date |
|---|---|---|
| 2,152,279 | Randall et al. | Mar. 28, 1939 |
| 2,411,411 | Blair et al. | Nov. 19, 1946 |
| 2,457,885 | Gatch | Jan. 4, 1949 |
| 2,541,209 | Cox | Feb. 13, 1951 |